Patented Oct. 10, 1950

2,525,594

UNITED STATES PATENT OFFICE 2,525,594

DEINKING WASTE PAPER

Francis L. Fennell, Niagara Falls, N. Y., assignor to E. I. du Pont de Nemours & Company, Wilmington, Del., a corporation of Delaware No Drawing. Application March 6, 1947, Serial No. 732,941

3 Claims. (Cl. 92—1.5)

1

This invention relates to a process for removing ink from waste paper to produce a pulp suitable for being remade into paper, and in particular to a process wherein the ink is removed by the action of an alkali.

In the manufacture of paper, a large portion of stock often used consists of waste paper bearing printed matter, for example, magazines, books, telephone directories, catalogs, newsprint and the like. In conventional methods for reworking such stock into paper, it is first subjected to a deinking process wherein the paper is pulped and cooked with an aqueous alkaline solution. Various alkalies have been proposed for this process and generally solutions of caustic soda or soda ash are utilized. In a typical conventional method the paper is pulped by agitation in a solution of caustic soda containing 5 to 7% of caustic soda of the dry weight of the paper to produce a pulp having a consistency of 5 to 7%. Generally the caustic solution utilized in the pulping operation is hot, e. g. around 180° F. and the hot pulp is passed to a cooking tank where the pulp is maintained at a temperature of 180 to 200° F. until the ink has become separated from the fibers. A cooking time of several hours, e. g. around 4 hours, generally is required. The cooked pulp is then washed to remove the separated ink pigments together with fillers and the like which may be present in the paper and to remove most of the alkali present. After washing, the pulp is ready to be utilized in the manufacture of paper except that for certain grades of paper the pulp may be bleached as desired by conventional means.

An object of this invention is to provide an improved process for alkali deinking of waste paper. A further object is to shorten the time required for deinking and to decrease the temperature of the alkali deinking process, whereby the capacity of the deinking equipment may be materially increased and the requirements for steam or other source of heat may be decreased. Another object is to decrease shrinkage (increase yields) in the deinking process. A still further object is to produce a deinked pulp which requires less subsequent treatment such as bleaching in order to produce a good grade of paper therefrom. Still further objects of the invention will be apparent from the ensuing description.

The aforesaid objects are accomplished in accordance with the present invention by subjecting printed waste paper to the action of an alkaline aqueous solution containing alkali metal peroxide, followed by washing.

One preferred method of practicing the invention, which is illustrative thereof, will be described. A weighed amount of waste paper such as magazine stock with or without shredding or other mechanical pre-treatment, is fed together with an alkaline solution into a pulping apparatus which consists essentially of a tank equipped with a powerful agitator. The alkaline solution is made by adding to water equal parts by weight of caustic soda and sodium peroxide, in the proportions of 1.5% of the dry weight of the paper, of each and the amount of solution charged is proportioned to produce a pulp of about 5 to 7% consistency. Thus a charge of 1000 lbs. of waste paper (air dry basis), is pulped in a solution containing 15 lbs. of caustic soda, 15 lbs. of sodium peroxide and about 15,000 to 20,000 lbs. of water. Before charging, the solution is preheated to 140 to 160° F. The resulting hot pulp is transferred to a cooking tank, where it is heated by means of steam and maintained at a temperature of about 160° F. until the ink has been satisfactorily searated from the fibers. This generally requires from 1 to 2 hours. The cooked pulp is then screened and washed by conventional means until it is substantially freed from ink pigments, fillers and sizings and the like and most of the alkali has been removed. The pulp is then ready for the paper making operations. Generally it is preferred to subject the pulp to a conventional hypochlorite bleach before passing it to the paper machine, in order to obtain a good white grade of paper.

When the same process is carried out using a caustic soda solution in the absence of peroxide, in order to obtain comparable results, it has been necessary to use a stronger caustic solution, namely one containing from 6 to 7% caustic by dry weight of the paper and to cook for a longer time, namely for about 4 hours, and at a temperature ranging from 180° F. in the pulping operation to 210° F. in the cooking operation. Also, pulp produced by the caustic soda process in the absence of peroxide generally requires more bleaching than that produced by the above described method using peroxide, to produce a paper having the same degree of whiteness.

The invention is not restricted to the above described procedure, which is merely illustrative. While I generally prefer to use an alkali metal hydroxide such as potassium hydroxide or sodium hydroxide, other alkalis or mixtures of them may be used in place of or in addition to the alkali metal hydroxide, for example soda ash or other alkali metal carbonate, calcium hydroxide or a sodium phosphate or silicate or borate. The alkalinity of the solution however, must be such that it has a pH value of at least 8. Generally higher pH values are preferred, e. g., for deinking magazine stock, a pH of 11 to 14, or alkalinity equivalent to about 2% of caustic soda, based on the dry weight of the paper, at a consistency of 2 to 15%. The optimum alkalinity will vary somewhat depending on the type of waste paper treated as can readily be determined by trials. In general paper consisting of or composed predominantly of groundwood pulp should be bleached at a relatively low pH, e. g. 8 to 11 whereas paper containing sulfite pulp or other chemical pulp is best treated at a pH above 10.

In place of sodium peroxide, I may use peroxides of the other alkali metals, hydrogen peroxide or other water soluble peroxygen compounds which do not destructively react with hydrogen peroxide, e. g. alkali metal persalts such as perborates, percarbonates and persulfates, and alkali metal salts of organic peracids such as peracetates, persuccinates, perphthalates, permaleates, perglutarates and other percarboxylates. Such peroxygen compounds may be added per se, or may be formed in the deinking solution, e. g. by reaction between a peroxide and an acid or salt. When hydrogen peroxide or other peroxygen compound having small or no alkalinity is used, sufficient alkali must be added to make an alkaline solution.

Per salts such as permanganates, which react with hydrogen peroxide to cause decomposition thereof are not within the scope of this invention, as the use of such persalts will not permit formation of a peroxide solution.

Since the peroxygen compounds specified above hydrolyze in aqueous solution to form solutions of hydrogen peroxide or alkali metal peroxide, the term "peroxide solution" is used herein and in the appended claims to denote solutions made by dissolving either hydrogen peroxide, sodium peroxide, or other peroxygen compound compatible with hydrogen peroxide.

The amount of sodium peroxide in the solution should be at least 0.25% of the dry weight of the paper treated. Generally I prefer a sodium peroxide content of 1 to 3% of the dry weight of the paper. Still larger amounts of peroxide may be utilized as desired. For example, I may use a solution made by dissolving only sodium peroxide in the water in an amount equivalent to as high as 10% or even more, of the dry weight of the paper, producing a pulp of from about 2 to 15% consistency. However, in general there is no advantage in exceeding a peroxide content above about 3% nor in exceeding an alkalinity equivalent to more than about 5 to 8% of caustic soda, based on the dry weight of the paper.

The ratio of water to pulp, that is to say the consistency of the pulp, may be varied over a wide range. (Herein the term "consistency" has the meaning usually conferred in the paper industry; that is, the percent consistency of the pulp is the percentage by weight of paper fiber, on the dry basis in the wet pulp, disregarding other ingredients. For example a pulp of 5% consistency contains 5 parts by weight of dry fiber to 95 parts by weight of water.) In most cases the preferred pulp consistency will lie in the range of about 2 to 15%. More dilute pulps can be treated equally well, but the capacity of the pulping and cooking equipment is correspondingly reduced. At consistencies above about 10-15% it is difficult to handle the pulp as a liquid mass.

The temperature likewise may vary considerably, depending upon the nature of the waste paper treated and the time of treatment, lower temperatures generally requiring a longer time. For deinking magazine stock, and other papers composed of chemical pulp, it is generally necessary to operate at temperatures above 120° F. For deinking papers of groundwood pulp type such as newsprint, good results can be obtained at lower temperatures, within the range of 80 to 120° F. However, for both types of paper, it is generally preferable to operate within the temperature range of 120 to 180° F. If desired, the temperature may be increased to 210° F. or about the boiling point, but good results are obtained at temperatures not exceeding 180° F. At a temperature of 140 to 180° F. deinking is usually complete within 0.25 to 2 hours.

In addition to caustic soda or other alkaline material, the solution may contain, if desired, buffering agents such as alkali metal borates, silicates, phosphates and the like. The use of such buffering agents is especially advantageous in deinking paper composed preponderantly of groundwood pulp, such as newsprint, telephone directories and the like. For example I have found that for deinking newsprint, the best results are obtained with a solution having a pH of 8 to 11, buffered by the addition of about 4 to 6% by weight of sodium silicate. In general, about 1 to 10% of such buffering agents may be used.

In deinking paper composed preponderantly of chemical pulp, e. g., magazine stock, the buffering agents are not of particular advantage, and preferably are omitted. The addition of silicate is sometimes disadvantageous in deinking paper, such as magazine stock, which contains large amounts of clay or other fillers. In such cases the presence of silicates may cause difficulty in washing and screening the deinked pulp. Hence I prefer to use the buffering agents only for deinking newsprint and other paper composed largely or entirely of groundwood pulp.

The invention is not restricted to the above mentioned buffering agents, as other alkali buffering agents may be used, as will be apparent to skilled chemists.

The gist of the invention is that printed waste paper is pulped and the pulp contacted with an aqueous alkaline solution containing a peroxygen compound at an elevated temperature. Various methods for pulping the paper and for treating the pulp with the alkaline peroxide solution and washing and bleaching the deinked pulp will be apparent to those skilled in the art of paper making. If desired, the paper may be pulped before adding either the peroxide or other alkali but generally it is preferable to pulp the paper in the alkaline solution containing the peroxide. Various methods and equipment known to the art for beating or pulping may be utilized. The cooking of the pulp can be carried out in any suitable tank or like equipment and cooking can be accomplished in the same equipment that is utilized for the beating or pulping operation. The paper may be pulped cold and heat applied after pulping, but it is generally preferable to pulp with a hot solution at the cooking temperature, so that deinking can occur during the pulping operation. If desired, the paper may be shredded or otherwise mechanically disintegrated before pulping; and the desirability of such pre-treatment, depending largely on the character of the pulping equipment utilized, will be apparent to those skilled in the paper making art.

The present method provides an economical method for producing a high grade of deinked pulp, utilizing a smaller amount of chemicals and smaller amount of steam for heating than are required in conventional alkali deinking processes. At the same time, the present invention accomplishes deinking in a shorter time and generally the resulting deinked pulp requires less bleaching in order to make a high grade white paper. Also, the yields of deinked pulp are generally higher, as less of the fiber is lost by chemical action of the alkali.

I claim:

1. A process for deinking waste paper composed of magazine stock containing clay filler which comprises pulping said paper in an aqueous sodium peroxide solution consisting of water, sodium peroxide and caustic soda, and containing an amount of said peroxide equal to 0.25% to about 3% of the dry weight of the paper and having an alkalinity equivalent to about 2% to 8% by weight of caustic soda based on the dry weight of the paper, to a pulp consistency of about 2 to 15%, maintaining the pulp at a temperature of about 140 to 160° F. for 1 to 2 hours and then screening and washing the pulp sufficiently to remove at least a major portion of the alkali present.

2. A process for deinking waste paper composed of magazine stock containing clay filler which comprises pulping said paper in an aqueous sodium peroxide solution consisting of water, sodium peroxide and caustic soda, and containing an amount of said peroxide equal to about 1 to 3% of the dry weight of the paper and having an alkalinity equivalent to about 2 to 8% by weight of caustic soda based on the dry weight of the paper, to a pulp consistency of about 2 to 15%, maintaining the pulp at a temperature of about 140 to 160° F. for 1 to 2 hours and then screening and washing the pulp sufficiently to remove at least a major portion of the alkali present.

3. A process for deinking waste paper composed of magazine stock containing clay filler which comprises pulping paper at a consistency of about 5 to 7% in a hot aqueous solution consisting of water, sodium peroxide and caustic soda, and containing an amount of sodium peroxide equal to about 1 to 3% of the dry weight of the paper and an amount of caustic soda equal to about 2% of the dry weight of the paper, the temperature of said solution and of the resulting pulp being maintained at about 140 to 160° F. for 1 to 2 hours, and then screening and washing the pulp sufficiently to remove at least a major portion of the alkali present.

FRANCIS L. FENNELL.

REFERENCES CITED

The following references are of record in the file of this patent:

UNITED STATES PATENTS

| Number | Name | Date |
| --- | --- | --- |
| 988,874 | Henkel et al. | Apr. 4, 1911 |
| 1,112,887 | Burbey | Oct. 6, 1914 |
| 1,138,597 | Winestock | May 4, 1915 |
| 1,226,735 | Wright | May 22, 1917 |
| 1,576,994 | Plumstead | Mar. 16, 1926 |
| 1,727,722 | Lewis | Sept. 10, 1929 |
| 1,925,372 | Darling | Sept. 5, 1933 |
| 1,933,228 | Snyder | Oct. 31, 1933 |
| 1,986,907 | Wells | Jan. 8, 1935 |
| 1,992,977 | Wells | Mar. 5, 1735 |
| 2,042,465 | Hines | June 2, 1936 |

FOREIGN PATENTS

| Number | Country | Date |
| --- | --- | --- |
| 265,055 | Great Britain | Feb. 3, 1927 |

OTHER REFERENCES

Printing Inks, by Ellis, published by Reinhold Publishing Corp., New York (1940), pages 480–483.

Deinking of Paper, by West, published by Institute of Paper Chemistry, Appleton, Wis., (1943), pages 5–10.